April 19, 1932.   G. R. MEYERCORD ET AL   1,854,413
COTTON PICKER UNIT
Original Filed Feb. 18, 1929
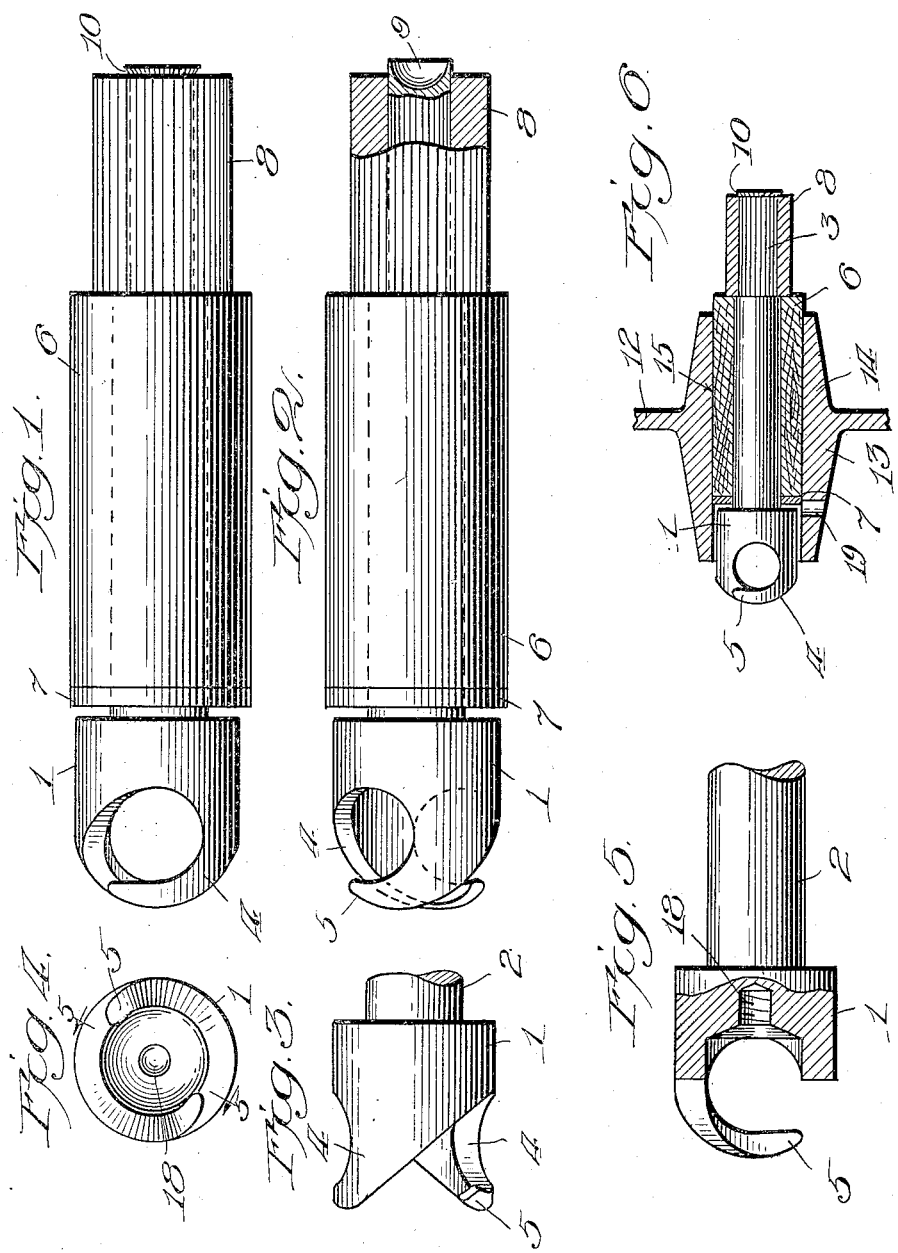
Inventor:
George R. Meyercord &
Alin H. Basquin,
By Wm. F. Freudenreich, Atty.

Patented Apr. 19, 1932

1,854,413

UNITED STATES PATENT OFFICE

GEORGE R. MEYERCORD AND OLIN H. BASQUIN, OF CHICAGO, ILLINOIS; SAID BASQUIN ASSIGNOR TO SAID MEYERCORD

COTTON PICKER UNIT

Original application filed February 18, 1929, Serial No. 340,836. Divided and this application filed November 8, 1930. Serial No. 494,236. Renewed March 2, 1932.

The present invention relates to that type of cotton picking machine having pronged fingers and adapted to rotate first in one direction and then in the other for the purpose of withdrawing fibre from the boll and afterwards discharging it; and the object of the present invention is to produce a simple and durable picking element of this kind that will successfully pick the cotton fibre and deliver it at a receiving point, without danger of injury to the stems or leaves of the cotton plant, and without picking green leaves along with the cotton.

The present application is a division of our application Serial No. 340,836, filed February 18, 1929.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figures 1 and 2 are side elevations of a picker unit and its bearing sleeve detached from the machine, the picker head being shown in different angular positions, and a fragment of the driving end being shown in section in Fig. 2; Fig. 3 is a side view of the head of the finger showing still another angular position; Fig. 4 is an end view of the finger; Fig. 5 is a section taken on line 5—5 of Fig. 4; and Fig. 6 is a view on a smaller scale than Figs. 1 to 5, partly in section and partly in elevation, illustrating the means for mounting the finger.

The finger illustrated in the drawings consists of a head 1 fixed to or integral with one end of a cylindrical stem 2 having at the free end a short section 3 of reduced diameter and preferably roughened on the surface. In making this particular finger, the head first takes the form of a cylindrical block. A hole is then drilled lengthwise of the finger through the end of the head and another hole is drilled crosswise through the head near the outer end. Two deep diagonal cuts are then made through the end of the head, 180° apart, these cuts extending through the cylindrical block and transforming it into two prongs or hooks 4 pointed at their outer ends and increasing gradually in width toward their inner ends or bases. As a matter of fact, the angular width of the base of each hook is approximately 180°. Thus the prongs or hooks have their outer faces disposed in a cylindrical surface coaxial with the finger. The free ends or points 5 of the hooks are then bent inwardly slightly toward the long axis of the finger and away from said cylindrical surface, and are also bent downwardly somewhat. The downward curve of the free ends of the hooks is emphasized by cutting away the upper or outer faces.

The picking fingers, which are present in large numbers in a complete machine, can be made very quickly and cheaply in the manner just described, and yet be very uniform in shape. When finished, the head ends are in the form of hollow cylinders whose walls are cut away to produce hooks, only the extreme ends of the hooks being deflected away from the outer cylindrical surfaces of the fingers.

When one of these picker fingers is moved against a cotton plant and is rotated in a direction tending to screw the hooked prongs into an object encountered thereby, it will be found that the end of the finger acts very much as though it were a round, polished knob when coming in contact with a leaf or a stem. However, when the finger meets a mass of fibre protruding from the boll, it readily enters a little way into the same and takes an effective grip thereon. When the finger and the boll are moved apart, while the finger is still rotating, the fibre will be withdrawn by the finger from the boll. Then, when the direction of rotation of the finger is reversed, the peculiar shape of the finger permits the cotton to fly off readily. Consequently a cotton plant will not be injured when scanned by one of my improved fingers, and no green leaves will be picked along with the cotton fibre. This latter characteristic of the finger is of the greatest importance because the gin will not separate green leaves from the cotton fibre and, if such leaves are picked along with the cotton, the grade of the cotton is lowered.

Surrounding the stem of the picker finger is a bearing sleeve 6 of a material that requires no oil to lubricate it, preferably hard close grained wood boiled in paraffin to make it waterproof. There is preferably a washer-like part of felt 7 between the inner end of the head of the picker and the adjacent end of the bearing sleeve. On the end section 3 of the stem is fitted a metal sleeve 8 adapted to engage with a suitable driving member for rotating the finger. The member 8 is a tight fit on the stem, the roughness of the surface of the part 3 of the stem contributing to the tightness of the fit when the sleeve 8 is driven or pressed on. Initially the free end of the part 3 of the stem contains a recess or depression 9, as best shown in Fig. 2, providing a comparatively thin annular flange or lip that may conveniently be expanded, as indicated at 10 in Figs. 1 and 6, to secure a rivet effect without requiring the finger to be subjected to forces that might bend it.

The head of the picker finger is smaller in diameter than the bearing sleeve 6, and so is the sleeve 8. Consequently the picker finger unit with its bearing sleeve and operating sleeve may be completely assembled before being placed in the machine. The support for the finger units may have the desired number of holes distributed according to the distribution desired for the fingers, the holes being of a size to make the bearing sleeves a tight fit; so that the picker units may be assembled on their ultimate supports by simply pressing the bearing sleeves into the holes provided therefor. Since the external diameter of the bearing sleeve is larger than the external diameter of any other part of the picker unit, the units may be entered into their respective holes from either side of the support. Furthermore, since the picker units are simply frictionally held in the support, any complete unit may be pushed back upon encountering an obstruction in the field, without breaking or damaging the finger. In other words, the friction between the sleeve and the surrounding support is sufficient to hold the sleeve stationary under normal conditions, but is not great enough to resist a blow or a thrust considerably less than that required to damage the prongs on the picker finger.

In Fig. 6, we have shown a means for mounting one of our improved fingers; 12 representing a support in the form of a metal plate and 13 and 14 representing registering bosses on opposite sides of the plate. A hole 15 is bored lengthwise through the two bosses; this hole being of such a size that the wooden sleeve will fit tightly in the same. In assembling the parts, the unit is forced into the opening in the support until a considerable portion of each of the prongs or hooks, at the base of the latter, lies within the bore or opening 15. The result is that the prongs or hooks project only slightly from the boss and cannot readily be injured. If a blow were struck or a heavy pressure exerted on the picker head in the direction of the length of the picker unit, the result would be simply to push the entire unit in until the boss 13 formed a housing or protective casing for the entire head. After a finger has been pushed in to an inoperative position, it need only be pushed out again in order to become once more effective. In the arrangement shown, each picker finger head is provided in the outer end, in the space between the prongs, with a tapped hole 18. In order to pull out a finger that has been pushed back, a simple pulling tool may be screwed into the tapped hole and serve as a means to draw out the finger to its normal position.

Foreign matter may enter the opening or bore 15 around the sides of the picker finger head. In order that such foreign matter may escape without entering the bearing, a discharge outlet or port 19 which extends from the bore 15, at the rear end of the picker finger head, down through the bottom of the cone 13 may be provided. Consequently, any dirt or other foreign matter that passes in behind the head will work its way out through the hole or port 19.

It will thus be seen that we have produced a simple and novel picker unit, whereby cotton may effectively be picked without injury to the plant and without collecting green leaves along with the cotton; which cannot easily be injured in service; and which, because of the absence of bearing surfaces that must be greased or oiled, insure that no oil will collect in or on the cotton that is being picked.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. A picker finger comprising a cylindrical head, two hook-shaped prongs projecting from the head and having their body portions following the cylindrical contour of the head extended, the angular width of each prong being approximately 180° at the base and decreasing gradually toward the points, and the over-all angular width of each prong from the tip to the rear edge at the base being at least 180°.

2. A picker finger comprising a cylindrical head, two hook-shaped prongs projecting from the head and following the cylindrical contour of the head extended, the angular width of each prong being approximately 180° at the base and decreasing gradually toward the points, the points only of the hooks being bent inwardly away from said cylindrical contour and also downwardly toward the head.

3. A picker finger comprising a head, two hook-shaped prongs rising from the head, the angular width of each prong being approximately 180° at the base and decreasing gradually toward the point, the outer faces of the prongs lying substantially in a cylindrical surface coaxial with the finger excepting at the points, and the rear edges of the lower halves of the prongs being substantially straight, the points being deflected slightly inwardly from such surface.

4. A picker unit comprising a long stem, a short head member on one end of the stem, a short cylindrical driving member on the other end of the stem, one of said members being integral with the stem and the other being fixed to the stem, and a long bearing sleeve of anti-friction material surrounding the stem between said members.

5. A picker unit comprising a long stem, a short head member on one end of the stem, a short cylindrical driving member on the other end of the stem, one of said members being integral with the stem and the other being fixed to the stem, and a long bearing sleeve of wood surrounding the stem between said members.

In testimony whereof, we sign this specification.

GEORGE R. MEYERCORD.
OLIN H. BASQUIN.